United States Patent [19]

Machleder et al.

[11] 4,259,086

[45] Mar. 31, 1981

[54] MULTIPURPOSE HYDROCARBON FUEL AND LUBRICATING OIL ADDITIVE

[75] Inventors: Warren H. Machleder, Blue Bell; Joseph M. Bollinger, North Wales, both of Pa.

[73] Assignee: Rohm and Haas Company, Philadelphia, Pa.

[21] Appl. No.: 90,154

[22] Filed: Oct. 31, 1979

Related U.S. Application Data

[63] Continuation of Ser. No. 813,027, Jul. 5, 1977, which is a continuation-in-part of Ser. No. 671,462, Mar. 29, 1976, Pat. No. 4,048,081, which is a continuation-in-part of Ser. No. 536,074, Dec. 24, 1974, abandoned.

[51] Int. Cl.$^3$ .......................... C10L 1/22; C10M 1/34; C07C 93/14
[52] U.S. Cl. ............................................. 44/58; 44/63; 44/72; 44/73; 44/74; 44/75; 44/78; 252/51.5 R; 544/162; 546/329; 564/349
[58] Field of Search .............. 260/570.7 OH, 570.7 R; 44/72, 73, 74, 75, 78, 58, 63; 252/51.5 R; 544/162; 546/329

[56] References Cited

U.S. PATENT DOCUMENTS

| | | | |
|---|---|---|---|
| 4,024,083 | 5/1977 | Kablaoui et al. | 44/75 X |
| 4,048,081 | 9/1977 | Machleder et al. | 44/75 X |
| 4,134,846 | 1/1979 | Machleder et al. | 44/75 X |

*Primary Examiner*—Thomas A. Waltz

[57] ABSTRACT

Substituted phenol/epichlorohydrin/amine adducts as multipurpose, low concentration additives for hydrocarbon fuels, lubricating oils and mixtures thereof.

11 Claims, No Drawings

MULTIPURPOSE HYDROCARBON FUEL AND LUBRICATING OIL ADDITIVE

RELATED APPLICATIONS

This is a continuation of application Ser. No. 813,027 filed July 5, 1977. The latter is a continuation-in-part of application Ser. No. 671,462 filed Mar. 29, 1976, now U.S. Pat. No. 4,048,081. The latter is a continuation-in-part of application Ser. No. 536,074 filed Dec. 24, 1974, now abandoned.

BACKGROUND OF THE INVENTION

This invention relates to multipurpose additives for hydrocarbon fuels and lubricating oils.

Detergent motor fuel and lubricating oil additives availabe today generally suffer from one or more deficiencies. Either they are used at very high concentrations, for example, of the order of 4000 ppm, or if used at lower, more economical levels, their detergency and other desirable properties are substantially diminished or lost.

The motor fuel detergency properties relate to ability of the additive to clean up and maintain the cleanliness of the carburetor and other elements of the fuel induction system, such as the intake valves and ports, and to reduce the octane requirement increase of an internal combustion engine by reducing the buildup of combustion chamber deposits. Another property is the ability of the additive to maintain a low level of hydrocarbon and carbon monoxide exhaust gas emissions so that phosphorus-containing additives are not required. Still other desirable properties include rust corrosion protection, water demulsibility properties, anti-icing properties, and the like.

SUMMARY OF THE INVENTION

It has been conceived and demonstrated that the reaction products of certain substituted phenols, epichlorohydrin and amines show excellent carburetor, induction system and combustion chamber detergency and, in addition, provide effective rust inhibition when used in hydrocarbon fuels at low concentrations, i.e., between about 20 to 600 ppm and, more preferably, between about 60 to 400 ppm. In addition to their activity as fuel additives, these compounds are also ashless rust inhibitors and dispersants for use in lubricating oils at concentrations of about 0.1 to 10% by weight, preferably about 0.5 to 8% by weight. The products may also be described as, for example, the reaction products of an alkyl phenol with epichlorohydrin followed by amination with an amine such as ethylene diamine or other primary or secondary mono or polyamine. As hydrocarbon motor fuel (such as gasoline or desel fuel) additives, the adducts of the invention act to control spark plug fouling and thus help to keep the spark plugs relatively clean and free of deposits.

According to a preferred aspect of the present invention, there is provided a normally liquid, multipurpose composition for addition to a leaded, low lead, manganese or unleaded gasoline, i.e., to a distillate hydrocarbon fuel comprising a major proportion of a hydrocarbon base fuel distilling within the gasoline distillation range. The additive provides carburetor, induction system and combustion chamber detergency, rust inhibition and good handling properties to a higher degree than normally found with current first generation multipurpose carburetor detergents of the alkyl ammonium phosphate or polyolefin succinimide type. The increased performance sought is necessitated in part by the advent of emissions control hardware which must remain deposit-free if the new automobiles are to remain within the United States EPA emissions specifications for 50,000 miles as required for vehicle certification.

Although there are many carburetor detergents on the market, it is believed that only one, Chevron F-310, can be classified as a true second generation additive possessing the broad activity achieved with the amine adducts of the invention. However, F-310, is recommended at a high treating level of 4000 ppm, and that may exceed the industry's handling or economic capabilities. Therefore, there is currently no additive available which is completely acceptable in terms of economics, treating level and performance.

DETAILED DESCRIPTION

The multipurpose additives of the invention are the reaction products of (a) a glycidyl ether compound (I) of the formula:

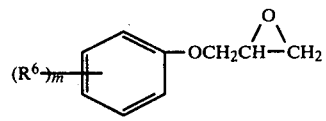

where $R^6$ is an aliphatic hydrocarbon group containing at least 8 carbon atoms and m is 1–3, and (b) a primary or secondary monoamine or polyamine, that is, an amine having at least one amino group having at least one active hydrogen atom. The mole ratio of glycidly either to amine can be 1:1, less than 1:1 or at least 1:1, depending on the number of active hydrogen atoms available for reaction, the extent of glycidyl ether substitution desired, and the economics of the reaction considering the ease or difficulty with which the substitution can take place. Thus, while ethylene diamine has four active amino hydrogen atoms and theoretically therefore can be tetra-substituted with the glycidyl ether reactant, the degree of substitution is influenced by the number, position and bulk of the $R^6$ groups. When $R^6$, for example, is $C_8$ or $C_9$ and m is 1 or 2, tetra substitution on ethylene diamine occurs with ease. A glycidyl ether compound to amine mole ratio of at least 4:1 is therefore appropriate, although a lower degree of substitution can be achieved by a lower mole ratio, if desired. However, when $R^6$ is long chain alkyl and/or bulkier in configuration, such as polyalkylene of 500 or higher molecular weight, it may be difficult to achieve more than di substitution by the glycidyl ether compound and then primarily only mono substitution on different nitrogen atoms may occur.

The glycidyl ether compound (I) is conveniently prepared by condensingg a metal alkoxide of a phenol having 1–3 aliphatic hydrocarbon substituents ($R^6$) with an excess or epichlorohydrin. The carbon content and number of aliphatic hydrocarbon substituents are chosen to provide the required degree of solubility of the final glycidyl ether compound/amine adduct in hydrocarbon fuels or lubricating oils.

In this specification unless otherwise stated, molecular weights are number average molecular weights and "alkyl" includes any aliphatic hydrocarbon radical, whether straight or branched chain, derived ffrom an alkane.

A variety of alkyl phenols are commerically available for preparing the glycidyl ether compounds, including octyl phenol, nonyl phenol, dodecyl phenol, octadecyl and pentadecyl phenol, in their various mono, di the tri-substituted forms and isomeric mixtures thereof. As is well-known, the alkylation of phenol produces a mixture of mono-. di- and tri-alkylated phenols, predominating in ortho and para substituted products. Preferred products are those containing at least 60% of the alkyl substituent para to the phenolic hydroxyl group. The monoalkylated phenol is the preferred product but di- or trialkylated products need not be removed from the admixture. The substituted phenols wherein the substitutent is polyalkylene are prepared by methods well-known in the art, for example, by the acid-catalyzed alkylation of phenol with an olefin. They are also readily prepared by polymerizing a low molecular weight mono-olefin containing from about 2 to 10 carbon atoms, such as ethylene, propylene, propylene, butylene, pentene and decene, and then alkylating the phenol with the polyolefin. Preferably, the resulting polyalkylene substitutent will have a molecular weight of about 500–2000, more preferably about 600–1500, wherein the polyalkylene is the polymerization product of propylene or butene, whether straight or branched chain or mixtures thereof. A preferred $R^6$ substitutent is made by the polymerization of propylene or butene, or mixture thereof, to produce a polyisopropylene or polyisobutene mixture. While the major product of the alkylation is the para substituted, mono polyalkylene phenol, some di-and tri- substitution will also occur. Accordingly, the invention includes the use of such substituted mixed products.

Any amine having at least one amino groups having at least one active hydrogen atom may be reacted with the glycidly ether compounds (I) to form the adduts of the invention. Accordingly, suitable amines include primary and secondary mono and polyamines such as aliphatic amines, aromatic amines, cyclic amines, and heterocyclic amines. A single amine may also contain both primary and secondary amino groups. The amines may also carry one or more inert substitutents, that is, substituents which do not substantially affect the reactivity of an amine group toward the glycidyl either compound nor the properties of the final adducts as multipurpose additives for fuels and lube oils. Among such relatively inert substituents may be mentioned hydroxyl, halo, nitro, sulfide, cyano, carbonyl in various forms such as ester, amide and ketone groups, nonpolymerizable unsaturated groups, and tertiary amino groups.

Examples of the amines include the primary alkyl amines such as methly amine, ethyl amine, n-propyl amine, isopropyl amine, n-butyl amine, isobutyl amine, 2-ethylhexyl amine, dodecyl amine, stearyl amine, hexyl amine, eicosyl amine, triacontyl amine, pentacontyl amine, and the like, including those in which the alkyl group contains from 1 to 50 carbon atoms. Also, diaklyl amines may be used such as dimethyl amine, diethyl amine, methylethyl amine, methylbutyl amine, di-n-hexyl amine, methyl dodecyl amine, dieicosyl amine, methyl triacontyl amine, dipentacontyl amine, and the like, including mixtures thereof.

Another useful class is the N-substituted compounds such as the N-alkyl imidazolidines and pyrimidines. Also, aromatic amines having a reactive hydrogen atom attached to nitrogen can be used. These include aniline, N-methyl aniline, ortho, meta and para phenylene diamines, α-naphthyl amine, N-isopropyl phenylene diamine, and the like. Heterocyclic amines are likewise useful including morpholine, thiomorpholine, N-(3-aminopropyl)morpholine, pyrrole, pyrroline, pyrrolidine, 3-aminomethyl pyridine, tetrahydrofurfuryl amine, indole, pyrazole, pyrazoline, pyrazolidine, imidazole, imidazoline, imidazolidine, piperidine phenoxazine, phenathiazine, and mixtures thereof, including their substituted homologs in which the substituent groups include alkyl, aryl, alkaryl, aralkyl, cycloalkyl and the like.

A preferred class of amines is given by the formula II:

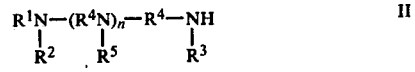

where $R^1$, $R^2$ and $R^3$ independently are hydrogen, $C_1$–$C_6$ alkyl substituted by —$NH_2$ or —OH, $R^4$ is a $C_1$–$C_6$ divalent hydrocarbon radical (alkylene or phenylene), $R^5$ is hydrogen or $C_1$–$C_6$ alkyl, and n is 0 to about 5 . These amines include amines wherein the amino groups are bonded to the same or different carbon atoms. Some examples of diamine reactants where the amine groups are attached to the same carbon atoms of the alkylene radical $R^4$ are N,N-dialkylmethylenediamine, N,N-dialkanol-1,1-ethanediamine, and N,N-di(aminoalkyl)-2,2-propanediamine.

Some examples of diamine reactants in which the amine groups are bonded to adjacent carbon atoms of the $R^4$ alkylene radical are N,N-dialkyl-1,2-ethanediamine, N,N-dialkanol-1,2-propanediamine, N,N-di(aminoalkyl)-2,3-butanediamine, and N,N-dialkyl-2,3-(4-methylpentane)diamine.

Some examples of diamine reactants in which the amine groups are bonded to carbon atoms on the alkylene radical represented by $R^4$ which are removed from each other by one or more intervening carbon atoms are N,N-dialkyl-1,3-propanediamine, N,N-dialkanol:1,3-butanediamine, N,N-di(aminoalkyl)-1,4-butanediamine, and N,N-dialkyl-1,3-hexanediamine.

Some examples of hydroxyl substituted radicals are 2-hydroxy-n-propyl, 2-hydroxyethyl, 2-hydroxy-n-hexyl, 3-hydroxy-n-propyl, 4-hydroxy-3-ethyl-n-butyl, and the like. Some examples of amine substituted $R^1$, $R^2$ and $R^3$ radicals are 2-aminoethyl, 2-amino-n-propyl, 4-amino-n-butyl, 4-amino-3,3-dimethyl-n-butyl, 6-amino-n-hexyl, and the like. Referred $R^1$, $R^2$ and $R^3$ radicals are unsubstituted alkyl radicals such as methyl, ethyl, n-propyl, isopropyl, secbutyl, n-amyl, n-hexyl, 2-methyl-n-pentyl, and the like.

Some specific examples or diamine reactants are: N,N-dimethyl-1,3-propanediamine; N,N-dibutyl-1,3-propanediamine; N,N-dihexyl-1,3-propanediamine; N,N-dimethyl-1,2-propanediamine; N,N-dimethyl-1,1-propanediamine; N,N-dimethyl-1,3-hexanediamine; N, N-dimethyl-1,3-butanediamine; N,N-di(2-hydroxyethyl)-1,3-propanediamine; N,N-di(2-hydroxybutyl)-1,3-propanediamine; N,N-di-(6-hydroxyhexyl)-1,1-hexanediamine; N,N-di-(2-aminoethyl)-1,3-propandiamine; N,N-di(2-amino-n-hexyl)-1,2-butanediamine; N,N-di(4-amino-3,3-di-methyl-n-butyl)-4-methyl-1,3-pentanediamine; N-(2-hydroxyethyl)-N-(2-aminoethyl)-1,3-propanediamine; N,N-dimethylethylenediamine; 2-aminoethylaminoethanol; and 1,4-cyclohexydiamine.

Other useful polyamines are ethylene- and propylenepolyamines and include ethylenediamine, diethylenetriamine, triethylentetramine, tetraethylenepentamine, pentaethylenehexamine, hexaethyleneheptamine, propylenediamine, dipropylentriamine, tripropylentetramine, tetrapropylenepentamine, pentapropylenehexamine, and hexapropyleneheptamine. The ethylenepolyamines are preferred, that is amines of formula II wherein $R^1$, $R^2$, $R^3$, and $R^5$ are hydrogen, $R^5$ is ethylene, and n is 1–5. These polyamines can be prepared by well-known methods of the art such as by the reaction of ethylene or propylenedichloride with ammonia. Most of the above polyamines are commercially available.

As indicated, when the amine contains two or more active hydrogen atoms and when more than two moles of the glycidyl ether compound (I) are used in preparing the additives of the invention, poly-substitution can occcur. Accordingly, depending upon the selection of polyamine and glycidyl ether compound and the mole ratios of the reactants, the reaction product can have none, some, or all of the terminal or internal amino groups of the polyamine substituted. Those skilled in the art will appreciate the fact that in a condensation reaction of the type of this invention, involving a reactant (polyamine) having multiple reaction sites, the reaction product will usually be a mixture of the possible reaction products, although one or more of the products may predominate over the others. Accordingly, it will be understood that the reaction products of the invention include mixed products as well as single products.

A preferred product of the invention is N,N'bis[3-(p-H35-polyisobutylphenoxy)-2-hydroxypropyl]ethylene diamine, shown by the structural formula III where $R^6$ is hydrogen or $PIB_{H35}$:

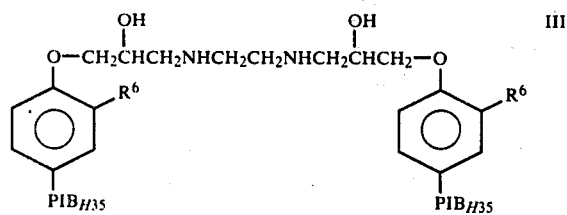

PIB is an abbreviation for a polyisobutene generically of any molecular weight. H35 is the commercial designation for Amoco Chemical Company's polyisobutene having a number average molecular weight ($\overline{Mn}$) of about 670.

More generally, the PIB component may have a number average molecular weight of about 500 to 2000, preferably about 600 to 1500. Optionally, some of the polyisobutene may be in the ortho position ($R^6$). $R^6$ may, therefore, simply be the same as PIB or $R^6$ may be hydrogen.

As indicated in the general description above, the preferred product can be a mixture of structure III and structure (IV) set forth below or it can be III or IV taken singly. In other words, on a parts per 100 parts basis, III can vary from 1 to 99 parts and IV can vary from 99 to 1 part; or there can be 100 parts of III or 100 parts of IV, all parts being on a weight basis.

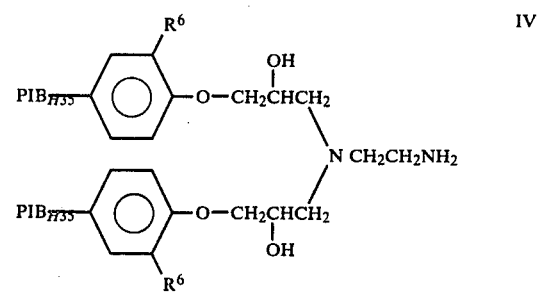

where $R^6$ is as defined in structure III.

The overall amount for use of the amine adduct(s) remains the same no matter what may be the proportions of isomers in the products.

The preferred chemical gasoline additive compound of this invention is prepared by the following reaction sequence where $R^6$ is $PIB_{H35}$:

(a) Phenol is alkylated with polyisobutene, i.e., polyisobutylene, of molecular weight of about 670 (Amoco H35) using an acid catalyst.
(b) The polyisobutylphenol is converted to the sodium phenoxide using sodium hydroxide and then reacted with epichlorohydrin.
(c) Two moles of the epichlorohydrin adduct are reacted with one mole of ethylene diamine to form the desired product.

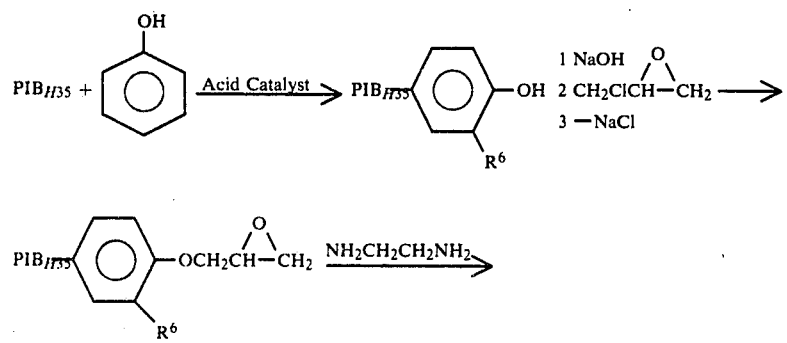

-continued

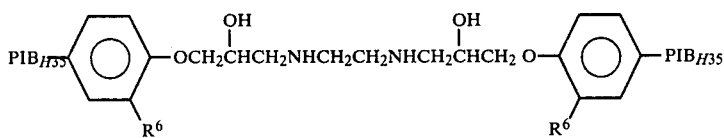

The reaction product may be separated from the hydrocarbon solvent usually employed as the reaction medium or the product may be left in the solvent and the mixture used as a concentrate for blending with a hydrocarbon fuel. If the product is to be used in a heating oil or a lubricating oil, or even if it is to be used in a motor fuel, a concentrate in neutral oil (about one-third neutral oil and two-thirds amine adduct) is a convenient blending composition. The concentrate may be further diluted, if desired, to contain about 10–60% by weight of amine adduct.

Exposure with a large number of product compounds of the type shown in the reaction schemeabove, indicates that a polysiobutene in the molecular weight range of 500–2000 and polyamine of the ethylene diamine, diethlene triamine type produces the best balance of properties in terms of detergency, rust inhibition and handling. Tables I and II below report such properties. The test procedures (A, B, C) are described after the tables.

Table I presents data comparing the preferred product of the present case (formula III or IV) with Chevron F-310. The essential component in Chevron F-310 is believed to be a polybutene amine as described in U.S. Pat. No. 3,438,757. The data which indicate the percent reduction in deposits versus untreated gasoline shows that the preferred product greatly improves the performance of untreated gasoline and provides performance comparable to F-310 at a much reduced treating level.

TABLE I

| | PERFORMANCE OF SECOND GENERATION CARBURETOR DETERGENT | | | |
|---|---|---|---|---|
| Additive | Recommended Treating Level, lbs./1000 bbls.* | ASTM-D665 Rust Test % Area Rusted | Carburetor Detergency Blowby Test (A) % Deposit Reduction | Induction System Test (B) Single Cylinder % Deposit Reduction |
| Control Base Gasoline | — | 100 | 0 | 0 |
| Chevron F-310 | 1000 | 0 | 96 | 99 |
| Amine adduct of invention | 75 | 0–5 | 95 | 94 |

*Barrels of gasoline

Table II presents data showing the ability of the preferred product of the invention (formula III or IV) to control the increase in the octane number requirement of an engine as measured by the Combustion Chamber Deposit Engine Test described hereinafter (C). Although the mechanism of activity is not firmly established, the additive presumably works by preventing the buildup of deposits in the combustion chamber.

TABLE II

| OCTANE NUMBER REQUIREMENT INCREASE | | |
|---|---|---|
| Additive | Treating Level, lbs./1000 bbls in Gasoline (Nonleaded) | Octane Number (C) Requirement Increase |
| Untreated Base Gasoline | — | 10 |
| Amine adduct | 75 | 5 |

TABLE II-continued

| OCTANE NUMBER REQUIREMENT INCREASE | | |
|---|---|---|
| Additive | Treating Level, lbs./1000 bbls in Gasoline (Nonleaded) | Octane Number (C) Requirement Increase |
| of invention | | |

MS-08 gasoline is used in the Blowby Carburetor Detergency Keep Clean Engine Test (A). Phillips "J" Reference Fuel, an unleaded fuel, is used in the Induction System Test (B) of Table I and also in the Combustion Chamber Deposit Engine Test (C) of Table II.

ENGINE TEST EVALUATION OF MULTIPURPOSE CARBURETOR DETERGENTS

(A) BLOWBY CARBURETOR DETERGENCY KEEP CLEAN ENGINE TEST Engine Test Procedure The Blowby Carburetor Detergency Keep Clean Engine Test (BBCDT-KC) measures the ability of a gasoline additive to keep clean the carburetor throttle body area, and is run in a 1970 Ford 351 CID V-8 engine equipped by means of a special "y" intake manifold with two one-barrel carburetors, which can be independently adjusted and activated. With this arrangement, a separate test fuel can be evaluated by each carburetor which feeds four of the eight cylinders via the non-interconnected intake manifold. The carburetors are modified with removable aluminum sleeves in order to facilitate weighing of the deposits which accumulate in the throttle body area. The severity of the test is adjusted to an appropriate level by recycling the entire amountof blowby gases, approximately 90–110 c.f.h., to the top of the air cleaner so that each carburetor receives an equal volume of these gases. Equal intake mixture flow through each carburetor is adjusted during the first hour of operation of means of intake manifold differential pressure and CO exhaust gas analysis. The following test cycle and operating conditions are employed:

| Test Cycle: | |
|---|---|
| Phase I | 650 engine rpm, 8 min. |
| Phase II | 3000 engine rpm, 1 min. |

-continued

| Test Cycle: | |
|---|---|
| Test duration, hrs. | 10 |
| Intake air, °F. | 135 ± 10 |
| Jacket water, °F. | 190 ± 10 |
| Engine oil-sump, °F. | 210 ± 10 |
| Percent CO in exhaust | 3.0 ± 0.2 |
| Blowby, c.f.h. | 90-110 |

The weight (mgs.) of deposits acccumulated on the aluminum sleeve is measured, and the average value of four tests per additive or additive mixture is reported.

The gasoline used in the BBCDT-KC test is an MS-08 gasoline having the following properties:

| Gravity: | |
|---|---|
| API | 59.7 |
| Sp. gr. at 60° F. | 0.74 |
| ASTM D-86 distillation, °F.: | |
| I.B.P. | 93 |
| 10% | 123 |
| 50% | 205 |
| 90% | 348 |
| E.P. | 405 |
| Percent recovered | 98 |
| Percent residue | 1 |
| Percent loss | 1 |
| Percent sulfur | 0.11 |
| Lead, gm./gal. | 3.08 |
| FIA composition: | |
| Aromatics, percent | 23.1 |
| Olefins, percent | 20.0 |
| Saturates, percent | 56.9 |
| Oxidation stability, minutes | 600+ |
| ASTM gum (unwashed), mg./100 ml. | 1.0 |
| Research octane number | 95.5 |
| Percent H | 13.10 |
| Percent C | 86.61 |
| H/C | 1.80 |

(B) INDUCTION SYSTEM DEPOSIT ENGINE TEST

Engine Test Procedure

The Induction System Deposit Test (ISDT) which is used to evaluate the ability of gasoline additives or mixtures of additives to control induction system deposits, is run using a new air-cooled, single cylinder, 4 cycle, 2.5 H.P. Briggs and Stratton engine for each test. The engine is run for 150 hours at 3000 rpm and 4.2 ft. lbs. load, with a 1 hour shutdown every 10 hours to check the oil level. Carbon monoxide exhaust emission measurements are made each hour to insure that a constant air to fuel (A/F) ratio is being maintained.

Upon completion of a test run, the engine is partially disassembled, and the intake valve and port are rated and valve and port deposits are collected and weighed.

(C) COMBUSTION CHAMBER DEPOSIT ENGINE TEST

Engine Test Procedure

The Combustion Chamber Deposit Engine Test (CCDET) is used to evaluate the ability of a gasoline additive or mixture of additives to control or reduce the octane number requirement increase (ONRI) in an internal combustion engine. The test is run using a 1972 Chevrolet 350 CID V-8 engine equipped with a two-barrel carburetor and a 1972 Turbo Hydromatic 350 transmission which is connected to a 1014-2WIG dynamometer equipped with a 200.3 lb.-ft.$^2$ inertia wheel. The following test cycle and operating conditions are employed and are intended to simulate an urban taxi cab.

| Test Cycle: | |
|---|---|
| Phase I | Start - idle, 650-750 rpm |
| Phase II | Accelerate - 1 to 2 shift, 5.5 sec., 2900-3000 rpm |
| Phase III | Accelerate - 2 to 3 shift, 9.5 sec., 2800-2900 rpm |
| Phase IV | 3rd gear, 10.0 sec., 2600 rpm |
| Phase V | Decelerate to idle, 15.0 sec. |
| Test duration | 200 hrs. |
| Fuel consumption | 1000 gal. (Phillips "J" Reference Fuel, an unleaded fuel) |
| Intake air, °F. | Ambient |
| Jack water, °F. | 180 |
| Engine oil-sump, °F. | 220 ± 10 |

Octane number requirement is determined at 24 hrs. interval under the following engine conditions: transmission in 3rd gear with an output shaft speed controlled at 1500 rpm and the engine throttle wide open. The octane number requirement of the engine is determined at trace knock in terms of primary reference fuels; i.e., the engine is run on a series of blends of isooctane and n-heptane of known octane number until audible knock is perceived. The lowest standardized octane number blend at which the engine does not knock is recorded as the octane number requirement. Octane number requirement increase is then the difference between the initial octane number requirement and the final octane number requirement for a particular test.

One of the unique features of the products of this invention is that they are one of the few non-ionic compounds that provide a high degree of rust inhibition. This is an important feature in a gasoline additive since ionic rust inhibitors, i.e., carboxylic and phosphoric acid salts, tend to aggravate the problem of induction system deposits. In addition, a non-ionic or ashless rust inhibitor is a key component in formulating an ashless engine oil. Therefore, the products of this invention have utility as natural or synthetic lubricating oil additives as well as motor fuel additives.

In addition to use in all types of gasoline fuels, the products have multipurpose utility in other liquid hydrocrbon motor fuels, particularly of the diesel and jet engine types, and in heating fuel oils such as furnace oils, burner oils, and the like.

Accordingly, the multipurpose additives of the invention have valuable utility in two- and four-cycle combustion ignition engines for controlling or reducing carburetor, induction system and combustion chamber deposits, and for control or reduction of octane number requirement increase, spark plug fouling and power loss; and in compression ignition (diesel) engines for controlling piston and fuel injector deposits, and for reducing smoke emissions and power loss. While optimum use levels in various systems may differ, an advantage provided in common is multifunctional utility at relatively low use levels.

The fuel or lubricating oils containing an amine adduct of the invention may also be formulated with any of the conventional additives, including antiknock agents, ignition accelerators, combustion improvers, power improvers, cold starting aids, autoignition inhibitors, antioxidants, gum inhibitors, corrosion inhibitors, sludge inhibitors, detergents, metal deactivators, stabilizers, dispersants, tetra-ethyl lead stabilizers, stabilizers for metal carbonyls, varnish inhibitors, upper cylinder lubricants, scavengers, octane-requirement-increase depressants, surface ignition inhibitors, spark plug fouling inhibitors, dyes, foam inhibitors, odor inhibitors, odor masking agents, anti-icing agents, decolorizing agents, odorants, identification markers, freezing point depressants, and flammability suppressors.

In the examples and throughout the specification and claims, all parts and percentages are by weight unless otherwise noted, and $R^6$ is hydrogen or the same as the other hydrocarbon substituent on phenol.

EXAMPLE 1

Part A: Polyisobutene H35 Phenol

Reaction: ($R^6$ is H or PIB$_{H35}$)

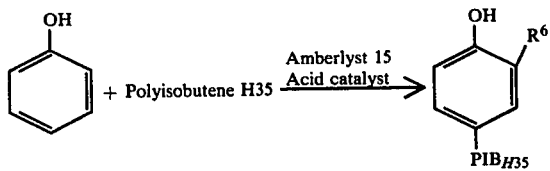

To a 5-l. 3-necked flask equipped with a thermometer, mechanical stirrer, and reflux condenser with Dean-Stark trap was charged 1920 g. (2.9 moles) of polyisobutene H35 (Amoco) of about 660 molecular weight, 564 g. (6 moles) of phenol, 200 g. of Amberlyst 15 acid catalyst, and 550 ml. of hexane. The stirred mixture was heated at reflux (pot temperature 100°–107° C.) under a nitrogen atmosphere for 24 hours, during which time 5.4 ml. of water had separated. After cooling to 60°–80° C., the mixture was filtered to remove the resin beads, the latter being washed with hexane, and the filtrate subjected to vacuum concentration with a pot temperature of 160° C. There was obtained 1971.4 g. of product residue having an oxygen content of 2.92% (theoretical: 2.12%) and molecular weight of about 754. The product is actually a mixture of alkylated phenols with an average molecular weight of 548 based upon the oxygen and 556 calculated from UV spectral parameters, i.e., in some of the products $R_6$ is hydrogen and in others $R_6$ is PIB$_{H35}$.

Part B:
1,2-Epoxy-3-[p-(H35-polyisobutyl)phenoxy]propane

Reaction: ($R^6$ is H or PIB$_{H35}$)

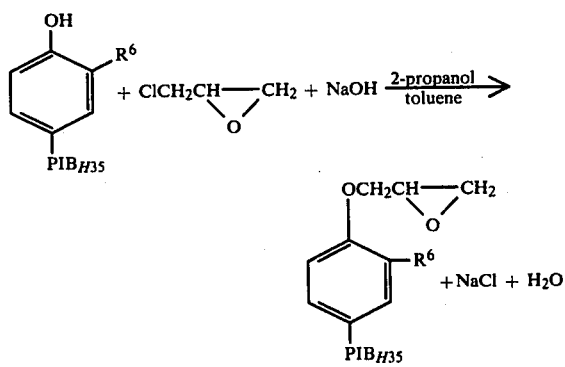

To a 5-l. 3-necked flask fitted with a thermometer, mechanical stirrer, addition funnel and reflux condenser was charged 973 g. (1.75 moles based upon 2.92% oxygen) of the polyisobutene H35 phenol obtained in Part A, 72 g. (1.75 moles based upon 97.4% assay) of sodium hydroxide pellets, 450 ml. of toluene. The stirred mixture was heated under a nitrogen atmosphere at 84°–90° C. for one hour to effect the dissolution of the base. Epichlorohydrin (161.9 g., 1.75 moles) was then added dropwise at 60° C. during 2.5 hours, followed by a hold period at 70° C. The reaction mixture was then cooled, filtered, and the salt (107 g. dry) washed with toluene. The filtrate was stripped (100° C./15 mm.) to give 1075.3 g. of product residue having a molecular weight of about 810.

Part C:
N,N'-Bis]3-(p-H35-polyisobutylphenoxy)-2-hydroxypropyl]ethylene diamine

Reaction: ($R^6$ is H or PIB$_{H35}$)

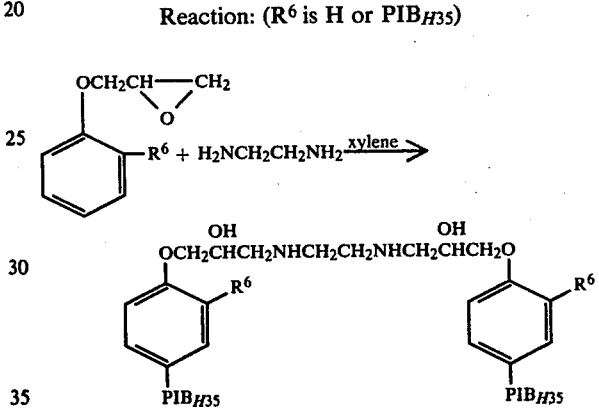

A mixture of 1018.4 g. of the epoxide product of Part B, 122.6 g. (2.04 moles) of ethylene diamine, and xylene (700 ml.) was heated at reflux (131°–136° C.) with stirring under a nitrogen atmosphere for 18 hours. After vacuum stripping (18 mm., pot temperature of 120° C.), there was obtained 1053.4 g. of turbid residue which was filtered through a bed of Celite 545 in a steam-heated Buchner funnel to give clear, yellow viscous product of molecular weight about 1680. The mixture obtained in this synthesis may contain the N,N' diadduct, the N,N diadduct and some N or N' monoadduct. The product prepared in this way had 1.26% basic nitrogen (1.67% theory) and 5.26% oxygen (3.81% theory).

EXAMPLE 2

Part A: Polyisopropylphenol

To a 5-liter, 4-necked round-bottomed flask fitted with a stopcock on the bottom, a condenser, a stirrer, a thermometer, and an addition funnel, were charged, under nitrogen, 1150 g (2.0 moles) Ampol $C_{20}$ polypropylene. The reaction was heated to 70° C. and 236 g (2.5 moles) of phenol were added followed by the dropwise addition (10 minutes) of 102.4 g (0.4 mole) BF$_3$ Phenol complex. The reaction mixture was heated to 95° C. and held there 5 hours. The reaction mixture was then cooled to 70° C., diluted with 600 cc toluene, and a solution of 131.4 g (1.24 moles) Na$_2$CO$_3$ in 1050 cc water was slowly added. The mixture was heated to 80° C. and the layers were allowed to separate. After discarding the aqueous layer, the organic layer was washed with 100 cc water. The organic layer was then vacuum stripped (180°, 0.25 mm) to afford 1260 g (94%) polyisopropylphenol ($\overline{M}n \sim 737$).

Part B: Polyisopropylphenyl Glycidyl Ether

To a 5-liter, 4-necked round-bottomed flask fitted with a condenser, addition funnel, stirrer, and thermometer were charged 1260 g (1.71 moles) above polyisopropylphenol. A 50% NaOH solution (137.3 g, 1.71 moles) was then added and the mixture heated with stirring to reflux (118° C.) and held there for 0.5 hours. The mixture was vacuum stripped at 100° (0.5 mm) to remove water, recharged with 50 g toluene, and restripped (105°, 0.2 mm) to azeotropically remove the last traces of water. The reaction was then cooled to 65° C. and 792 g (8.55 moles) epichlorohydrin was added and the reaction heated to reflux ($\sim$120° C.) for three hours. The excess epichlorohydrin was then vacuum stripped at 120° (0.05 mm) to yield $\sim$1450 g of the crude glycidyl ether.

Part C:
N,N'-Bis[3-(p-polyisopropylphenoxy)-2-hydroxypropyl]ethylene diamine

Part C of Example 1 was repeated in all essential respects except for substitution of the polyisopropyl (PIP) glycidyl ether adduct of Part B above for the polyisobutene phenol/epichlorohydrin adduct of Part B of Example 1. The product may also contain N,N-diadduct and N or N' monoadduct.

The additive of Example 2 was tested in the Carburetor Detergency, Induction System Deposits and ASTM D-665 Rust tests described in Table I and thereafter above, with the following improved results

TABLE III

| Additive | Conc. lbs./ 1000 bbls. | ASTM-D665 Rust Test, % Area Rusted | (A) Carburetor Detergency, mg. deposit | (B) Induction System Deposits, mg. |
|---|---|---|---|---|
| Base gasoline Chevron | — | 100 | 20 | 2200 |
| F-310 | 1050 | 5–15 | 0.2 | 100 |
| Ex. 2 adduct | 75 | 0–0 | <1 | 11 |
|  | 50 | 0–5 | 0.8–1.9 | 219 |
|  | 30 | 5–10 | 1.4 | 761 |

EXAMPLE 3

The procedures of Example 2 were repeated in all essential respects except that only one equivalent of ethylene diamine was reacted with the polyisopropylphenyl glycidyl ether adduct. The product was primarily the N-monoadduct of the formula:

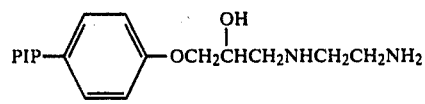

where PIP is the polyisopropyl substituent.

The Carburetor Detergency, Induction System Deposits and ASTM D-665 Rust tests described in Table I and thereafter above were performed, using the product of this example, with the following improved results:

TABLE IV

|  | Base Unleaded Fuel | Ex. 3 Additive | Additive Conc., ppm |
|---|---|---|---|
| (A) Carb. Deterg., mg. deposit | 100 | 11 | 60 |
| (B) Induction System Deposits, mg. | 2280 | 1190 | 60 |
|  | — | 93 | 300 |
| Rust Test, % area rusted | 100 | 0 | 300 |

EXAMPLE 4

Octylphenol/Epichlorohydrin/Ethylene Diamine Adduct

To a 3-liter, 4-necked round-bottomed flask fitted with a condenser, addition funnel, stirrer, and thermometer is charged 418 g. (2.0 moles) octylphenol. A 50% aqueous NaOH solution (160 g., 2.0 moles) is then added and the mixture heated with stirring to reflux and held there 0.5 hours. The mixture is then vacuum-stripped at 100° C. (0.5 mm) to remove water, charged with 50 g. toluene, and restripped (105°, 0.5 mm) to azeotropically remove the last traces of water. The reaction is then cooled to 65° C. and 925 g. (10 moles) epichlorohydrin is added and the reaction heated to reflux (about 120° C.) for three hours. The excess epichlorohydrin is then vacuum stripped at 120° C. (0.1 mm) to afford the crude glycidyl ether intermediate.

To the crude glycidyl ether is added 300 cc xylene. The reaction mixture is then heated to 150° C. Ethylene diamine (60.1 g, 1.0 mole) is added over a two hour period, and the reaction is held at 150° C. for an additional two hours. The reaction mixture is filtered and stripped (150° C., 0.1 mm). The reaction product is a useful multipurpose additive for hydrocarbon fuels and lubricating oils in accordance with the invention and has the following structure:

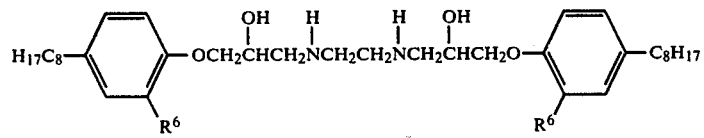

where $R^6$ is H or —$C_8H_{17}$.

Although the N,N' structure is shown above, it will be understood that the product may also be the N,N structure or a mixture of the N,N' and N,N structures.

EXAMPLE 5

The procedure of Example 4 is repeated in all essential respects except for substitution of nonylphenol for octylphenol and mole ratio of nonylphenol/epichlorohydrin intermediate to ethylene diamine, to afford products predominating in mono, di, tri or tetra adducts identified by the following structural formula:

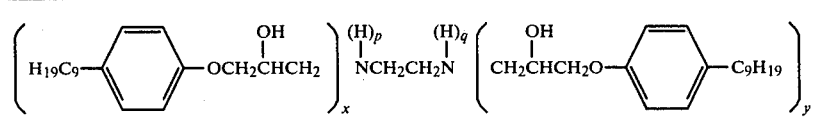

| Additive | x | y | p | q |
| --- | --- | --- | --- | --- |
| Mono adduct | 1 | 0 | 1 | 2 |
| Di adduct | 2(1) | 0(1) | 0 | 2 |
| Tri adduct | 2 | 1 | 0 | 1 |
| Tetra adduct | 2 | 2 | 0 | 0 |

The four reaction products, when tested as in Examples 2 and 3 at a concentration of 300 ppm, gave the following improved results, wherein it will be noted that the tetra adduct gave the best results:

TABLE V

|  |  | Base Non-leaded Fuel | Additive | | | |
| --- | --- | --- | --- | --- | --- | --- |
|  |  |  | Mono | Di | Tri | Tetra |
| (A) | Carb. Deterg., mg. deposit | 100 | 1.3 | 0.6 | 0.6 | 2.1 |
| (B) | Induction System Deposits, mg. | 2200 | 1290 | 283 | 304 | 36 |
|  | Rust Test, % Area Rusted | 100 | 0 | 0 | 0 | 0-5 |

EXAMPLE 6

N-(3-Aminopropyl)-Morpholine Adduct With Polypropylphenyl Glycidyl Ether

A one-liter, 4-necked flask was charged with 370 g. (0.46 moles) of a polyisopropylphenol glycidyl ether (prepared as in Example 2, Part B), 81.2 g. (0.56 moles) N-(3-aminopropyl) morpholine and 350 cc xylene. The flask was fitted with a stirrer, condenser, and thermometer. The reaction was heated at 150° C. for 5 hours, then vacuum stripped at 150° C. (0.1 mm). The residue was diluted with 400 cc toluene and washed with a solution of 300 cc water, 100 cc saturated NaCl solution, and 300 cc n-butanol. The washed organic fraction was vacuum stripped at 120°, and then filtered hot to afford 360 g product (2.28% basic nitrogen). The product is a multipurpose additive when used as described in Examples 1–5.

EXAMPLE 7

3-Aminomethyl Pyridine Adduct with Polypropylphenyl Glycidyl Ether

A one-liter, 4-necked flask was charged with 370 g. (0.46 moles) of a polyisopropylphenyl glycidyl ether (prepared as in Example 2, Part B), 60.8 g. (0.56 moles) 3-aminomethylpyridine, and 250 cc xylene. The flask was fitted with a stirrer, condenser, and a thermometer. The reaction was refluxed at 135°–140° for 5 hours. The reaction product was then vacuum stripped at 120°, dissolved in 400 cc toluene, and washed with a mixture of 300 cc saturated salt solution and 300 cc n-butanol. The product was further washed with 300 cc water, vacuum stripped at 110° C. (0.2 mm), and filtered hot to afford 327 g. product (2.56% basic nitrogen). The product is a multipurpose additive when used as described in Examples 1–5.

EXAMPLE 8

2-Aminoethylaminoethanol Adduct with Polypropylphenyl Glycidyl Ether

A one-liter, 4 necked flask was charged with 370 g (0.46 moles) of a polyisopropylphenyl glycidyl ether (prepared as in Example 2, Part B), 60 g. (0.56 moles) 2-aminoethylaminoethanol, and 250 cc xylene. The flask was fitted with a stirrer, condenser, and a thermometer. The reaction was heated 5 hours at 150° C., then vacuum stripped at 150° (0.1 mm). The product was then diluted with 250 cc toluene, and washed with a mixture of 300 cc saturated salt solution and 300 cc n-butanol. The product solution was rewashed with hot water, vacuum stripped at 120°, and filtered hot to afford 318 g. product having multipurpose additive utility when used as described in Examples 1–5.

EXAMPLE 9

Aniline Adduct with Polypropylphenyl Glycidyl Ether

A one-liter, 4 necked flask was charged with 362 g. (0.45 moles) of a polyisopropylphenyl glycidyl ether (prepared as in Example 2, Part B, 52 g. (0.56 moles) aniline, and 250 cc xylene. The flask was fitted with a stirrer, condenser, and a thermometer. The reaction was heated 5 hours at 150°, then vaccum stripped at 150° (0.15 mm). The product was dissolved in 300 cc toluene and washed with a mixture of 300 cc saturated salt solution and 200 cc n-butanol. The product was further washed with 300 cc water, vacuum stripped at 120°, and filtered hot to afford 328 g. product having utility as a multipurpose additive when used as described in Examples 1–5.

EXAMPLE 10

Dimethylethylenediamine Adduct With Polypropylphenyl Glycidyl Ether

A two-liter, 4 necked flask was charged with 326 g (0.4 moles) of a polyisopropylphenyl glycidyl ether (prepared as in Example 2, Part B), 70.5 g (0.8 moles) unsym. dimethylethylenediamine, and 225 cc xylene. The flask was fitted with a stirrer, condenser, and a thermometer. The reaction was heated 5 hours at 120°, then vacuum stripped at 120° (0.2 mm). The product was dissolved in 400 cc toluene and washed with a mixture of 400 cc hot water, 80 cc n-butanol, and 6 g 50% NaOH. The organic fraction was rewashed with 400 cc water (four times), then vacuum stripped at 120° (0.25 mm) and filtered hot to afford 313 g. product (2.30% basic nitrogen). The product is a multipurpose additive when used as described in Examples 1–5.

EXAMPLE 11

Hexylamine Adduct with Polypropylphenyl Glycidyl Ether

A two-liter, 4 necked flask was charged with 320 g. (0.4 moles) of a polyisopropylphenyl glycidyl ether (prepared as described in Example 2, Part B), 147 g. (1.4 moles) hexylamine, and 225 cc xylene. The flask was fitted with a stirrer, condenser, and thermometer. The reaction was heated 5 hours at 120°, then vaccum stripped at 120° (0.15 mm). The product was dissolved in 400 cc toluene and washed with a mixture of 400 cc warm, saturated salt solution, and 6 g 50% NaOH. The organic fraction was rewashed with water, then vacuum stripped at 120° C. (0.15 mm) and filtered hot to afford 315 g. product (1.25% basic nitrogen) having utility as a multipurpose additive when used as described in Examples 1-5.

In general, as indicated in the foregoing specification, the additives of the invention provide detergency, rust inhibition and other benefits in liquid hydrocarbon blends, wherein the liquid hydrocarbons boil in the range of about 80° to 1000° F. Such hydrocarbons include gasoline or motor fuels boiling from about 85° to 450° F., distillate fuels (such as kerosene) boiling from about 350° to 650° F., and mineral lubricating oils boiling from about 650° to 1000° F.

The gasoline motor fuel which is benefited by the additive of the invention may be leaded or unleaded and may consist of straight-chain or branched-chain paraffins, cycloparaffins, olefins and aromatic hydrocarbons and mixtures of these. The base fuel can be derived from straight run naphtha, polymer gasoline, natural gasoline or from catalytically cracked or thermally cracked hydrocarbons and catalytically reformed stocks. The hydrocarbon composition and the octane level of the base fuel are not generally critical. Any conventional motor fuel base may be employed in the practice of this invention.

In general, the additive of the invention is added to a mineral oil composition in a minor amount, i.e., an amount effective to provide detergency to the oil composition. The additive is effective in a mineral oil in an amount ranging from about 0.001 to 5.0 weight percent based on the total composition. In a fuel composition, an amount ranging from about 0.001 to 0.2 weight percent is preferred with the most preferred concentration ranging from about 0.002 to 0.10 weight percent. It is understood, of course, that the additive can be employed in an oil concentrate for ease of handling containing from about 5.0 to about 50 weight percent of the additive.

OTHER MONOADDUCTS

Certain of the additives of the invention alternatively may be defined by the following formula (V):

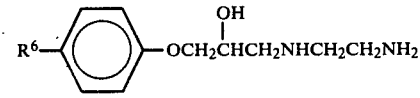

(V)

in which R is a hydrocarbon radical using a molecular weight ranging from about 200 to 1500, R' is hydrogen or an alkyl radical having from 1 to 4 carbon atoms, X is a divalent hydrocarbon radical having from 2 to 6 carbon atoms, Y is NH or O (oxy), and z has a value from 1 to 10, preferably 1 to 6.

It will be apparent from formula V that such compounds are the monoadducts resulting from the condensation reaction between a glycidyl ether of formula I and an amine or aminoalcohol in such proportions as to avoid substitution on more than one active nitrogen atom of the amine or aminoalcohol (if the amine or aminoalcohol contains more than one active nitrogen atom). Suitable amines and aminoalcohols include the alkylene polyamines and hydroxysubstituted amines such as ethylene diamine, diethylenetriamine, triethylene tetramine, tetraethylene pentamine, trimethylenediamine, tetramethylenediamine, pentaethylene hexamine, N-hydroxyethyl ethylene diamine monoethanolamine, and the like.

Accordingly, the monoadducts of formula V result from the reaction of such amines or aminoalcohols in a mole ratio of amine or aminoalcohol to glycidyl ether of formula I of at least 1:1, preferably in molar excess, of the order of 2:1 or more.

Preferred compounds of formula V are those wherein X is —CH$_2$CH$_2$, Y is —NH—, R has a molecular weight ranging from 200 to 1500, z has a value from 2 to 5. More preferably, R has a molecular weight ranging from 250 to 1200 when the adduct is used in a motor fuel such as gasoline, or 300 to 1000 when the adduct is used in a mineral oil composition comprising a mixture of hydrocarbons boiling in the range from about 80° to 1000° F.

The following examples illustrate the foregoing monoadducts. These adducts are useful multipurpose fuel and lubricating oil additives when used as previously described. The $\overline{M}n$ below the structure refers to the R$^6$ substituent.

EXAMPLE 12

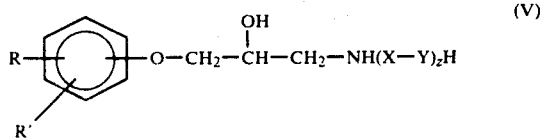

where R$^6$ is polyisopropyl ($\overline{M}n \sim 575$)

To a 3-liter, four-necked round-bottom flask fitted with a condenser, addition funnel, stirrer and thermometer was charged 560 g. (0.76 moles) of the polyisopropylphenol prepared in Part A of Example 2. A 50% NaOH solution (61.0 g., 0.76 moles) was then added and the mixture heated with stirring to reflux (118° C.) and held there for 0.5 hours. The mixture was then vaccum stripped at 100° to remove water and cooled to 60°. Epichlorohydrin (352 g. 3.8 moles) was then added and the reaction heated to reflux (~120° C.) for 3 hours. The reaction was vacuum stripped at 120° C. and diluted with 250 cc xylene. Ethylene diamine (230 g, 3.8 moles) was then added and the reaction was refluxed (118°-120° C.) 3 hours. The reaction mixture was vacuum stripped at 120° C. and diluted with 750 cc toluene and 750 cc saturated aqueous NaCl solution. Enough NaOH solution (3.4 g. of 50% solution) was then added to make the aqueous phase just alkaline and the mixture was heated with stirring at 80° C. The layers were then separated and the aqueous layer discarded. The solution was then washed three more times at 80° C. with 750 cc saturated NaCl solution, vacuum stripped, and filtered hot. The yield was 618 g. (95.3%), % basic nitrogen=2.51, of the monoadduct whose structure is given above.

EXAMPLE 13

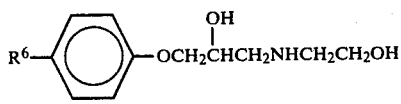

where $R^6$ is polyisopropyl ($\overline{Mn} \sim 860$)

The procedure of Example 2, Part A, was repeated in all essential respects except for substitution of 1720 g. (2.0 moles) of Ampol C$_{60}$ polypropylene for the Ampol C$_{20}$ of Example 2. The yield was 1810 g. (95%) polyisopropylphenol ($\overline{Mn}$ about 1232).

To a 3-liter, four-necked round-bottomed flask fitted with a condenser, addition funnel, stirrer and thermometer were charged 950 g (0.76 moles) of the polyisopropylphenol prepared above. A 50% NaOH solution (61.0 g, 0.76 moles) was then added and the mixture heated with stirring to reflux (118° C.) and held there for 0.5 hours. The mixture was then vacuum stripped at 100° C. to remove water and cooled to 60° C. Epichlorohydrin (352 g, 3.8 moles) was then added and the reaction heated to reflux (~120° C.) for 3 hours. The reaction was vacuum stripped at 120° C. and diluted with 250 cc xylene. Ethanol amine (46 g, 0.76 moles) was then added and the reaction was refluxed (118°-120° C.) 3 hours. The reaction mixture was vacuum stripped at 120° C. and diluted with 750 cc toluene and 750 cc saturated aqueous NaCl solution. Enough NaOH solution (3.4 g. of 50% solution) was then added to make the aqueous phase just alkaline and the mixture was heated with stirring to 80° C. The layers were then separated and the aqueous layer discarded. The solution was then washed three more times at 80° with 750 cc saturated NaCl solution, vacuum stripped, and filtered hot. The yield was 910 g. (87%), % basic nitrogen=0.5, of the monoadduct whose structure is set forth above.

EXAMPLE 14

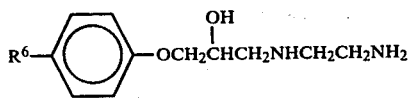

where $R^6$ is polyisopropyl ($\overline{Mn} \sim 860$)

The procedures of Example 12 were repeated in all essential respects except for substitution of Ampol C$_{60}$ polypropylene (1720, 2.0 moles) for Ampol C$_{20}$. The yield of polyisopropylphenol was 1810 g. (95%), $\overline{Mn}$ about 1232. The yield of monoadduct of the above structure was 916 g. (88%), % basic nitrogen=0.8.

EXAMPLE 15

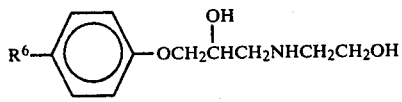

where $R^6$ is polyisopropyl ($\overline{Mn} \sim 575$)

The procedures of Example 12 were repeated in all essential respects except for substitution of N-methylethanol amine (57 g. 0.76 moles) for ethylene diamine.

The yield of monoadduct of the above structure was 485 g. (79%), % basic nitrogen=0.9.

EXAMPLE 16

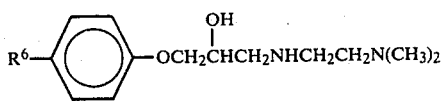

where R is polyisobutyl ($\overline{Mn} \sim 660$)

To a 300-ml. 3-necked flask equipped with a thermometer, mechanical stirrer and reflux condenser with Dean-Stark trap was charged 99.0 g (0.15 mol) of polyisobutylene (Indopol H-35, Amoco), 14.1 g (0.15 mole) of phenol, 28 ml. of hexane and 10.3 g, of Amberlyst 15 acid catalyst. The stirred mixture was heated at reflux (pot temperature 96°-99° C.) under a nitrogen atmosphere for 12 hours. Gravity filtration through a glass wool plug at 70° C. followed by a 10 ml. hexane bead rinse gave a clear, essentially colorless filtrate. Vacuum concentration to a pot temperature of 150° C. at 1 mm. Hg afforded 101.8 g. (90% yield) of product polybutenephenol as a viscous, golden brown oil having an $\overline{Mn}$ of 700 as determined by oxygen analysis and UV spectral parameters. Volatiles collected amounted to 13.2 g while 10.3 g of Amberlyst 15 were recovered.

The procedures of Example 12 were then repeated in all essential respects except for substitution of the foregoing polybutenephenol (530 g., 0.76 moles) for the polyisopropylphenol of Example 12, and the substitution of N,N-dimethyl-1,3-propane diamine (388 g, 3.8 moles) for the ethylene diamine of Example 12. The product was a monoadduct of the above structure.

EXAMPLE 17

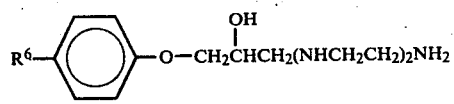

where $R^6$ is polyisobutyl ($\overline{Mn} \sim 660$ )

To a 500 ml round-bottomed flask were charged 150 g. (about 0.25 mole) of polyisobutyl phenylglycidyl ether (4.58% oxygen by difference of C and H analysis, 5.19% direct), 104.5 g (1.01 moles) of diethylenetriamine, and 100 ml toluene. The reaction mixture was stirred magnetically and, when the solution was homogeneous, heating to just below reflux was begun. This temperature was held for 16 hours. Toluene was then removed on the rotary evaporator and the excess amine with the vacuum pump. The yield of monoadduct of the above structure was 155 g. % basic nitrogen =2.43.

We claim:

1. A composition comprising a mixture of (1) a major proportion of a hydrocarbon fuel, a lubricating oil, or a mixture of a hydrocarbon fuel and a lubricating oil, and (2) a minor detergent amount of a multipurpose additive comprising the reaction product of (a) a glycidyl ether compound of the formula

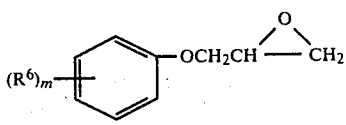

where $R^6$ is an aliphatic hydrocarbon group having at least 8 carbon atoms and m is 1-3, and (b) an amine having at least one amino group, said amine having two or more active hydrogen atoms, and wherein the mole ratio of (a) to (b) is at least 2:1, said amine being selected from aliphatic monoamines, cyclic amines, heterocyclic amines, aromatic amines, and aliphatic polyamines of the formula

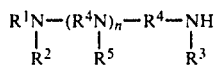

wherein $R^1$, $R^2$ and $R^3$ independently are hydrogen, $C_1$-$C_6$ alkyl substituted by $-NH_2$ or $-OH$, $R^4$ is a $C_1$-$C_6$ divalent hydrocarbon radical, $R^5$ is hydrogen or $C_1$-$C_6$ alkyl, and n is 0 to about 5.

2. The composition of claim 1 wherein said amine is the said aliphatic polyamine.

3. The composition of claim 1 wherein the mole ratio of said glycidyl ether compound to said amine is 2:1 to about 4:1.

4. The composition of claim 1 wherein the mole ratio of said glycidyl ether compound to said amine is 2:1 to about 4:1, $R^6$ is nonyl, and m is 1-2.

5. The composition of claim 1 wherein said amine is selected from N-(3-aminopropyl) morpholine, 3-aminoethyl pyridine, 2-aminoethylaminoethanol, N,N-dimethylethylenediamine, aniline and hexylamine.

6. The composition of claim 1 wherein $R^6$ is nonyl, m is 1-2, and said amine is selected from N-(3-aminopropyl) morpholine, 3-aminomethyl pyridine, 2-aminoethylaminoethanol, N,N-dimethylethylenediamine, aniline and hexylamine.

7. A multipurpose additive for a hydrocarbon fuel, a lubricating oil, or a mixture of a hydrocarbon fuel and a lubricating oil, comprising the reaction product of (a) a glycidyl ether compound of the formula

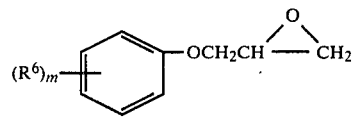

where $R^6$ is an aliphatic hydrocarbon group having at least 8 carbon atoms and m is 1-3, and (b) an amine having at least one amino group, said amine having two or more active hydrogen atoms, and wherein the mole ratio of (a) to (b) is at least 2:1, said amine being selected from aliphatic monoamines, cyclic amines, heterocyclic amines, aromatic amines, and aliphatic polyamines of the formula

wherein $R_1$, $R^2$ and $R^3$ independently are hydrogen, $C_1$-$C_6$ alkyl substituted by $-NH_2$ or $-OH$, $R^4$ is a $C_1$-$C_6$ divalent hydrocarbon radical, $R^5$ is hydrogen or $C_1$-$C_6$ alkyl, and n is 0 to about 5.

8. The additive of claim 7 wherein said amine is the said aliphatic polyamine.

9. The additive of claim 7 wherein the mole ratio of said glycidyl ether compound to said amine is 2:1 to about 4:1.

10. The additive of claim 7 wherein the mole ratio of said glycidyl ether compound to said amine is 2:1 to about 4:1, $R^6$ is nonyl, and m is 1-2.

11. The additive of claim 7 wherein said amine is selected from N-(3-aminopropyl) morpholine, 3-aminomethyl pyridine, 2-aminoethylaminoethanol, N,N-dimethylethylenediamine, aniline and hexylamine.

* * * * *

UNITED STATES PATENT AND TRADEMARK OFFICE
CERTIFICATE OF CORRECTION

PATENT NO. : 4,259,086
DATED : March 31, 1981
INVENTOR(S) : Warren H. Machleder et al It is certified that error appears in the above—identified patent and that said Letters Patent is hereby corrected as shown below:

Column 7, line 20, "Exposure" should be -- Experience -- .

Signed and Sealed this

Twentieth Day of September 1983

[SEAL]

Attest:

GERALD J. MOSSINGHOFF

Attesting Officer

Commissioner of Patents and Trademarks